US012607511B2

(12) United States Patent
Cui et al.

(10) Patent No.: US 12,607,511 B2
(45) Date of Patent: Apr. 21, 2026

(54) RECONSTRUCTION METHOD AND DEVICE FOR SPECTRAL IMAGE

(71) Applicants: TSINGHUA UNIVERSITY, Beijing (CN); BEIJING SEETRUM TECHNOLOGY CO., LTD., Beijing (CN)

(72) Inventors: Kaiyu Cui, Beijing (CN); Jiawei Yang, Beijing (CN); Yidong Huang, Beijing (CN); Wei Zhang, Beijing (CN); Xue Feng, Beijing (CN); Fang Liu, Beijing (CN)

(73) Assignees: TSINGHUA UNIVERSITY, Beijing (CN); BEIJING SEETRUM TECHNOLOGY CO., LTD., Beijing (CN)

( * ) Notice: Subject to any disclaimer, the term of this patent is extended or adjusted under 35 U.S.C. 154(b) by 746 days.

(21) Appl. No.: 17/989,527

(22) Filed: Nov. 17, 2022

(65) Prior Publication Data

US 2024/0027269 A1 Jan. 25, 2024

(30) Foreign Application Priority Data

Jul. 22, 2022 (CN) .......................... 202210872193.4

(51) Int. Cl.
*G01J 3/28* (2006.01)
*G06T 1/20* (2006.01)
(Continued)

(52) U.S. Cl.
CPC .............. *G01J 3/2823* (2013.01); *G06T 1/20* (2013.01); *G06T 5/70* (2024.01); *G06T 7/70* (2017.01);
(Continued)

(58) Field of Classification Search
CPC ............. G01J 3/2823; G01J 2003/2826; G01J 2003/2836; G01J 2003/284; G06T 7/70;
(Continued)

(56) References Cited

U.S. PATENT DOCUMENTS

2019/0096049 A1* 3/2019 Kim ......................... G06T 5/60
2021/0241428 A1 8/2021 Mansour et al.

FOREIGN PATENT DOCUMENTS

| CN | 110738605 A | 1/2020 |
|---|---|---|
| CN | 111260576 A | 6/2020 |
| CN | 114677300 A | 6/2022 |

OTHER PUBLICATIONS

Xiong, J., Cai, X., Cui, K., Huang, Y., Yang, J., Zhu, H., . . . & Zhang, W. (2020). One-shot ultraspectral imaging with reconfigurable metasurfaces. (Year: 2020).*

(Continued)

*Primary Examiner* — David Perlman
(74) *Attorney, Agent, or Firm* — Sheppard Mullin Richter & Hampton LLP

(57) ABSTRACT

A reconstruction method for spectral image includes: obtaining a measurement image of an imaging object, and reconstructing and obtaining a spectral image of the imaging object according to the measurement image and a pre-calibrated sensing matrix. The spectral image includes spectral information at different position points of the imaging object. Through the method, defects of the time-consuming spectral image reconstruction method and the low resolution of the obtained spectral image in the related art can be overcame and the spectral image of the target imaging object can be obtained by reconstructing quickly and the obtained spectral image has high spatial resolution and no mosaic.

13 Claims, 9 Drawing Sheets

A measurement image of an imaging object is obtained ⟶ S101

A spectral image of the imaging object is obtained by performing reconstruction according to the measurement image and a pre-calibrated sensing matrix; where the sensing matrix is determined by images corresponding to monochromatic lights of different wavelength bands and light intensities of corresponding monochromatic lights, and the spectral image includes spectral information at different position points of the imaging object ⟶ S102

(51) Int. Cl.
G06T 5/70 (2024.01)
G06T 7/70 (2017.01)

(52) U.S. Cl.
CPC .................. *G01J 2003/2826* (2013.01); *G01J 2003/2836* (2013.01); *G01J 2003/284* (2013.01); *G06T 2200/04* (2013.01); *G06T 2207/20084* (2013.01)

(58) Field of Classification Search
CPC ......... G06T 5/70; G06T 1/20; G06T 2200/04; G06T 2207/20084
See application file for complete search history.

(56) References Cited

OTHER PUBLICATIONS

Zhang, Jinhui, Xueyu Zhu, and Jie Bao. "Solver-informed neural networks for spectrum reconstruction of colloidal quantum dot spectrometers." Optics express 28, No. 22 (2020): 33656-33672. (Year: 2020).*

Manifold, Bryce. "Denoising of stimulated Raman scattering microscopy images via deep learning (Conference Presentation)." In Advanced Chemical Microscopy for Life Science and Translational Medicine, vol. 11252, p. 1125216. SPIE, 2020. (Year: 2020).*

Zhang, Kai, Wangmeng Zuo, Yunjin Chen, Deyu Meng, and Lei Zhang. "Beyond a gaussian denoiser: Residual learning of deep cnn for image denoising." IEEE transactions on image processing 26, No. 7 (2017): 3142-3155. (Year: 2017).*

Written Opinion of the International Searching Authority and International Search Report for PCT Application No. PCT/CN2023/112518 mailed on Oct. 27, 2023.

Yang et al., "Deep-learning based on-chip rapid spectral imaging with high spatial resolution", Apr. 7, 2023, 12 pages.

Xiong et al., "Dynamic brain spectrum acquired by a real-time ultraspectral imaging chip with reconfigurable metasurfaces", Apr. 22, 2022, 13 pages.

Xiong et al., "One-shot ultraspectral imaging with reconfigurable metasurfaces", http://arxiv.org/abs/2005.02689v3, Sep. 3, 2021, 21 pages.

Yuan et al., "Snapshot Compressive Imaging: Principle, Implementation, Theory, Algorithms and Applications", IEEE Signal Processing Magazine, Feb. 25, 2021, 46 pages.

* cited by examiner

Measurement image when the incident monochromatic light has a wavelength of 500 nm     Measurement image when the incident monochromatic light has a wavelength of 530 nm     Measurement image when the incident monochromatic light has a wavelength of 560 nm Reference image                Reconstruction method            Traditional point-by-point method
                                  for spectral image                for spectral reconstruction Information acquisition module                    120

Image reconstruction module                       121

RECONSTRUCTION METHOD AND DEVICE FOR SPECTRAL IMAGE

CROSS-REFERENCE TO RELATED APPLICATION

The present application claims priority to Chinese Application, No. 202210872193.4, filed on Jul. 22, 2022, entitled "Reconstruction Method and Device for Spectral Image", which is hereby incorporated by reference in entirety.

TECHNICAL FIELD

The present application relates to the technical field of spectral imaging, in particular to a reconstruction method and a reconstruction device for spectral image.

BACKGROUND

Traditional spectrometers need precision spectroscopic components and are complex, bulky, heavy and expensive. A micro-spectrometer can modulate an incident light by using different micro-nano structure arrays and recover spectral information of the incident light from the responses of detectors with the help of an algorithm. The micro-spectrometers can be periodically arranged in space to form a micro spectral imaging sensor which can be used to recover the spectral information at different points in space.

For example, a related art provides an optical modulation micro-nano structure including an optical modulation layer located on a photoelectric detection layer. The optical modulation layer can modulate an incident light to form different responses on the photoelectric detection layer to facilitate reconstruction to obtain the original spectrum. The optical modulation micro-nano structure can be a replacement of precision optical components in traditional spectrometers to realize an application of spectrometers in the field of micro-nano structure, so that the micro-integrated spectrometer can work without gratings, prisms, reflectors or other similar spatial spectroscopic components, which overcomes the problem that the traditional spectrometers rely too much on precision optical components which make the traditional spectrometers bulky, heavy and expensive.

However, spectral recovery algorithm used in the related art is still a traditional iterative optimization algorithm which is slow and takes a long time to complete a reconstruction process. For example, it takes several minutes or more to recover one spectral image, which is difficult to meet the requirements of real-time spectral imaging.

Moreover, the traditional iterative optimization algorithm obtains a whole spectral image by reconstructing the spectrum of each point in space one by one, and the reconstruction of spectrum of a single point requires a certain number of micro-nano structural units, which leads to a reduction of spatial resolution, for example, the reconstructed spectral image shows the characteristics of mosaic.

Therefore, the problem that the reconstruction method for spectral image in the related art is time-consuming and the resolution of the obtained spectral image is low is an urgent issue to be solved in the field of spectral imaging.

SUMMARY

The present application provides a reconstruction method and reconstruction device for spectral image to overcome the shortcomings of the spectral image reconstruction method in the related art, which is time-consuming and the obtained spectral image by which has a low resolution, and to realize a rapid reconstruction of the spectral image.

In a first aspect, the present application provides a reconstruction method for spectral image, including obtaining a measurement image of an imaging object, and performing reconstruction to obtain a spectral image of the imaging object according to the measurement image and a pre-calibrated sensing matrix; where the sensing matrix is determined by images corresponding to monochromatic lights of different wavelength bands and light intensities of corresponding monochromatic lights, and the spectral image includes spectral information at different position points of the imaging object.

In an embodiment, the performing reconstruction to obtain the spectral image of the imaging object according to the measurement image and the pre-calibrated sensing matrix includes: performing a linear transformation on the sensing matrix and the measurement image to obtain an initial spectral image of the imaging object; and performing noise reduction on the initial spectral image to obtain the spectral image.

In an embodiment, performing the linear transformation on the sensing matrix and the measurement image through a first preset formula, and the first preset formula is:

$$x^{(k)}=[\Phi^T\Phi+\gamma^{(k)}I]^{-1}[\Phi^Ty+(v^{(k-1)}+u^{(k-1)}];$$

where $x^{(k)}$ is an initial spectral image of $k^{th}$ stage, k is a label of a stage of the reconstruction method, $\Phi$ is the sensing matrix, $\gamma^{(k)}$ is a network trainable parameter of the $k^{th}$ stage, I is a unit matrix, y is the measurement image, $v^{(k-1)}$ is a spectral image of $(k-1)^{th}$ stage, an initial value of $v^{(k-1)}$ is $v^{(0)}=\Phi^Ty$, $u^{(k-1)}$ is an auxiliary variable of the $(k-1)^{th}$ stage, and an initial value of the variable $u^{(k-1)}$ is $u^{(0)}=0$.

In an embodiment, performing noise reduction on the initial spectral image through a second preset formula, and the second preset formula is:

$$v^{(k)}=D_k(x^{(k)}-u^{(k-1)});$$

where $v^{(k)}$ is a spectral image of $k^{th}$ stage, k is a label of a stage of the reconstruction method, $D_k$ is a noise reduction network of the $k^{th}$ stage, $x^{(k)}$ is an initial spectral image of the $k^{th}$ stage, and $u^{(k-1)}$ is an auxiliary variable of $(k-1)^{th}$ stage.

In an embodiment, the auxiliary variables x and u and the spectral image $v^{(k)}$ of the $k^{th}$ stage are converted through a conversion formula as follows:

$$u^{(k)}=u^{(k-1)}-(x^{(k)}-v^{(k)})$$

In an embodiment, the measurement image is obtained by a micro spectral imaging sensor; where the micro spectral imaging sensor at least includes an optical modulation layer and an image sensor layer under the optical modulation layer.

In an embodiment, the reconstruction method for spectral image further includes: storing the pre-calibrated sensing matrix corresponding to the micro spectral imaging sensor, where different pre-calibrated sensing matrixes correspond to different types of spectral imaging sensors; and establishing a corresponding relationship between the sensing matrix and the spectral imaging sensor.

In an embodiment, the pre-calibrated sensing matrix is obtained by the following steps: obtaining three-dimensional images obtained when monochromatic lights with different wavelengths are incident on a micro spectral imaging sensor, where the three-dimensional images at least include spectral information; and calculating to generate the pre-calibrated sensing matrix according to the obtained three-dimensional images and intensities of monochromatic lights with different wavelengths.

In an embodiment, performing noise reduction on the initial spectral image to obtain the spectral image includes: performing noise reduction based on a convolutional neural network on the initial spectral image through one or more of U-net network structure, auto-encoder structure and residual neural network structure.

In an embodiment, when performing noise reduction based on the convolutional neural network on the initial spectral image through the U-net network structure, the noise reduction based on the convolutional neural network includes processes of an input layer, a convolutional layer, a max-pooling layer, a transposed convolutional layer, and an output layer.

In an embodiment, when performing noise reduction based on the convolutional neural network on the initial spectral image through the self-encoder structure, the noise reduction based on the convolutional neural network includes processes of an input layer, a convolutional layer, a max-pooling layer, a transposed convolutional layer and an output layer.

In an embodiment, when performing noise reduction based on the convolutional neural network on the initial spectral image through the residual neural network structure, the noise reduction by the convolutional neural network includes processes of an input layer, a convolutional layer, a residual network block, and an output layer, where a residual network block consists of two convolutional layers.

In an embodiment, when performing noise reduction based on the convolutional neural network on the initial spectral image through a deep convolutional neural network, the noise reduction based on the convolutional neural network includes processes of an input layer, a convolution layer and an output layer.

In a second aspect, the present application further provides a reconstruction device for spectral image, including an information acquisition module, configured to obtain a measurement image of an imaging object; and an image reconstruction module, configured to perform reconstruction to obtain a spectral image of the imaging object according to the measurement image and a pre-calibrated sensing matrix; where the sensing matrix is determined by images corresponding to monochromatic lights of different wavelength bands and light intensities of corresponding monochromatic lights, and the spectral image includes spectral information at different position points of the imaging object.

In a third aspect, the present application further provides an electronic equipment, including a processor and a memory storing a computer program that is executable on the processor, the computer program, when executed by the processor, causes the processor to perform steps of any one of the above-mentioned reconstruction methods for spectral image.

In a fourth aspect, the present application further provides a non-transitory computer readable storage medium having a computer program stored thereon, and the computer program, when executed by a processor, causes the processor to perform steps of any one of the above-mentioned reconstruction methods for spectral image.

In a fifth aspect, the present application further provides a computer program product, including a computer program, and the computer program, when executed by a processor, causes the processor to perform steps of any one of the above-mentioned reconstruction methods for spectral image.

In a sixth aspect, the present application further provides a reconstruction system for spectral image, including a spectral imaging sensor and a reconstruction device for spectral image; where, the spectral imaging sensor is configured to obtain a measurement image of an imaging object; and the reconstruction device for spectral image is configured to perform reconstruction to obtain a spectral image of the imaging object according to the measurement image and a pre-calibrated sensing matrix;

where the sensing matrix is determined by images corresponding to monochromatic lights of different wavelength bands and light intensities of corresponding monochromatic lights, and the spectral image includes spectral information at different position points of the imaging object.

In the reconstruction method for spectral image provided by the present application, by obtaining the measurement image of the imaging object and performing reconstruction to obtain the spectral image of the imaging object according to the measurement image and the pre-calibrated sensing matrix, the shortcomings of the spectral image reconstruction method in the related art which is time-consuming and the obtained spectral image by which has a low resolution are overcame, the spectral image of the target imaging object can be obtained quickly and the obtained spectral image has high spatial resolution and no mosaic.

BRIEF DESCRIPTION OF DRAWINGS

In order to more clearly illustrate the solutions according to the embodiments of the present application or the related art, the accompanying drawings used in the description of the embodiments or the related art will be briefly introduced below. It should be noted that the drawings in the following description are a part of embodiments of the present application. For those of ordinary skill in the art, other drawings can also be obtained according to these drawings without creative efforts.

REFERENCE NUMERALS

1—optical modulation layer; 2—microlens layer; 3—image sensor layer; 11—inner unit.

DETAILED DESCRIPTION OF THE EMBODIMENTS

In order to make the objectives, solutions and advantages of the present application more clearer, the solutions in the present application will be described clearly and completely below in combination with the drawings in the present application. It should be noted that the described embodiments are part of the embodiments of the present application, not all embodiments. Based on the embodiments in the application, all other embodiments obtained by ordinary skill in the art without creative effects are within the scope of protection of the present application.

Figure 1:
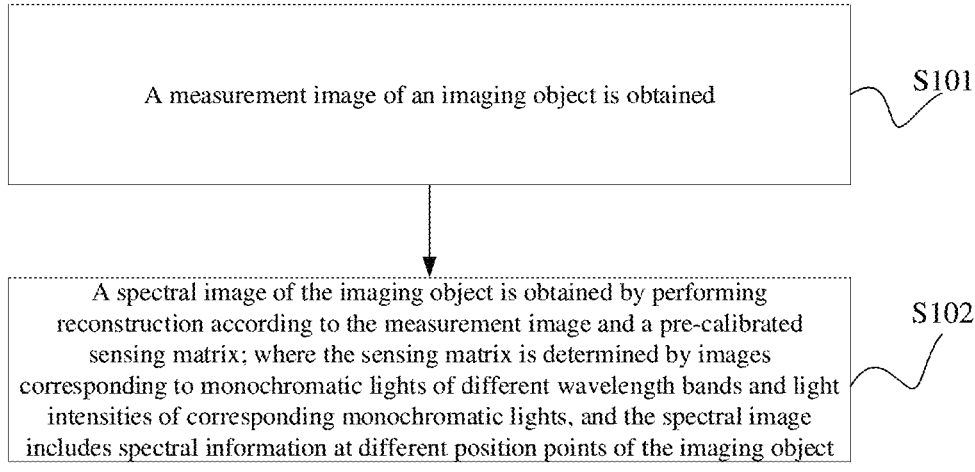
FIG. 1 is a flow diagram of a reconstruction method for spectral image provided by the present application.

FIG. 1 is a flow diagram of a reconstruction method for spectral image provided by the present application. As shown in FIG. 1, the reconstruction method includes the following steps.

S101, a measurement image of an imaging object is obtained.

It should be noted that, in an embodiment, the measurement image of the imaging object can be obtained by using a micro spectral imaging sensor.

In an embodiment, the incident lights with different wavelengths can be modulated by the micro-nano structure array in the micro spectral imaging sensor to obtain modulated lights, where the micro-nano structure is equivalent to a light filter structure. And then the modulated lights can be detected by an image sensor layer provided under the micro-nano structure array layer to obtain a measurement image of the imaging object. A plurality of pixel points formed correspondingly to different groups of pixel confirmation modules can be integrated to form an image containing a plurality of spectrum information.

In an embodiment, an intensity signal of the incident light at different wavelengths $\lambda$ is recorded as $f(\lambda)$, a transmittance curve passing through the micro-nano structure array is recorded as $T(\lambda)$, the micro-nano structure array includes $n$ groups of micro-nano structures and the transmittance of each group of micro-nano structures is different from each other, and the micro-nano structure array as a whole can be recorded as $Ti(\lambda)$, where i is a group label of the micro-nano structure and i=1, 2, 3, . . . , m.

There are corresponding physical pixels under each group of micro-nano structures. The physical pixels are located on the image sensor layer under the micro-nano structure array layer and the image sensor layer detects the light intensity Ii of the light modulated by the micro-nano structure.

It should be noted that a corresponding relationship between the physical pixel and the micro-nano structure can be that a physical pixel corresponds to a group of micro-nano structures, or a group of physical pixels containing a plurality of physical pixels corresponds to a group of micro-nano structures, which are not be limited here. In an embodiment, a group of physical pixels containing a plurality of physical pixels corresponds to a group of micro-nano structures and there are at least two different groups of physical pixels corresponding to different micro-nano structures.

A relationship between a spectral distribution of the incident light and a measured value of the image sensor layer can be expressed by formula (1):

$$Ii=\Sigma(f(\lambda)-Ti(\lambda)\cdot R(\lambda))\cdot T(\lambda)\cdot m; \tag{1}$$

where, $R(\lambda)$ is the response of the image sensor layer, and is denoted as:

$$S(\lambda)=Ti(\lambda)\cdot R(\lambda);$$

then the formula (1) can be extended to matrix form as:

$$\begin{bmatrix} I_1 \\ I_2 \\ \vdots \\ I_m \end{bmatrix} = \begin{bmatrix} S_{11} & S_{12} & \ldots & S_{1n} \\ S_{12} & S_{22} & \ldots & S_{2n} \\ \vdots & \ddots & \vdots & \vdots \\ S_{m1} & S_{m2} & \ldots & S_{nm} \end{bmatrix} \begin{bmatrix} f_{\lambda_1} \\ f_{\lambda_2} \\ \vdots \\ f_{\lambda_n} \end{bmatrix};$$

where, Ii(i=1, 2, 3, . . . , m) is a response of the image sensor layer after the light to be measured passes through a broadband filter unit and corresponds to the light intensity measurement values of $n$ image sensor units, which are also called $n$ physical pixels and is a vector of length $n$. S is a light response of the whole optical system to different wavelengths and is determined by a transmittance of a filter structure and a quantum efficiency of the response of the image sensor layer. S is a matrix in which each row vector corresponds to a response of a broadband filter unit to incident lights with different wavelengths. The incident light is sampled discretely and uniformly and there are n sampling points. The number of columns of S is the same as the number of sampling points of the incident light. $f(\lambda)$ is a light intensity of the incident light at different wavelengths $\lambda$, namely the incident light spectra to be measured.

In practical applications, a response parameter S of the system is known. The spectra f of the incident light can be obtained by backstepping with an algorithm through the light intensity I obtained by the image sensor layer. The calculation process can adopt different data processing methods according to the actual situation. The data processing methods include but are not limited to least squares, pseudo-inverse, equalization, least squares norm and artificial neural network methods.

On the basis of the above implementation, a snapshot spectral imaging device can be realized by arraying the spectral pixels. The micro-nano structures mentioned above include but are not limited to quantum dots, nanorods and modulation holes.

The micro spectral imaging sensor provided by the embodiment of the present application may have the same size with a traditional imaging sensor, and can perform light intensity sensing without gratings, prisms, reflectors or other similar spatial spectroscopic components, which greatly reduces a volume of object imaging recognition equipment. Moreover, it can modulate the incident light by using different structural units, which is also conducive to improving the accuracy of spectral reconstruction.

The imaging object can be any object which occupies a certain space and is composed of matter. In general, the measurement image is a two-dimensional grayscale image.

S102, a spectral image of the imaging object is obtained by performing reconstruction according to the measurement image and a pre-calibrated sensing matrix; where the sensing matrix is determined by images corresponding to monochromatic lights of different wavelength bands and light intensities of corresponding monochromatic lights, and the spectral image includes spectral information at different position points of the imaging object.

In an embodiment, based on the step S101, the spectral image of the imaging object is reconstructed and obtained according to the obtained measurement image and the pre-calibrated sensing matrix.

The sensing matrix is obtained by pre-calibrating the micro spectral imaging sensor. In an embodiment, the sensing matrix is obtained by dividing the measurement images obtained when monochromatic lights with different wavelengths are incident on the micro spectral imaging sensor by the intensity of the monochromatic light with the corresponding wavelength.

In an embodiment, in order to obtain the pre-calibrated sensing matrix, it is needed to obtain a three-dimensional image obtained when monochromatic lights with different wavelengths are incident on the micro spectral imaging sensor, and calculate to generate the pre-calibrated sensing matrix according to the obtained three-dimensional image and intensities of monochromatic lights with different wavelengths.

It should be noted that the pre-calibrated sensing matrix can be stored before reconstructing to obtain the spectral image, the pre-calibrated sensing matrix corresponds to the micro spectral imaging sensor, and the sensing matrices corresponding to different micro spectral imaging sensors are not the same.

For example, for many different micro spectral imaging sensors, sensing matrices corresponding to these different micro spectral imaging sensors are pre-calibrated and stored. When a micro spectral imaging sensor is used, the pre-stored sensing matrix corresponding to this micro spectral imaging sensor can be called directly to reconstruct to obtain the corresponding spectral image.

Figure 2:
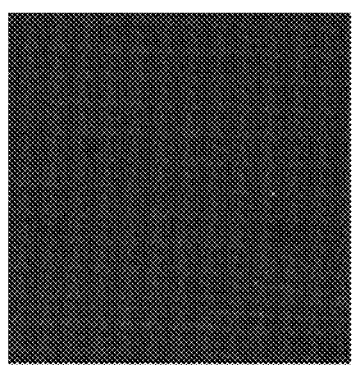
FIG. 2 is a diagram of a measurement image obtained when monochromatic lights with different wavelengths are incident on a micro spectral imaging sensor provided by the present application.
Figure 2:
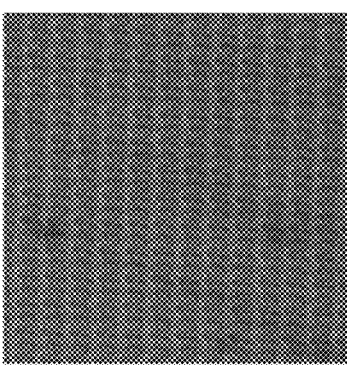
Figure 2:
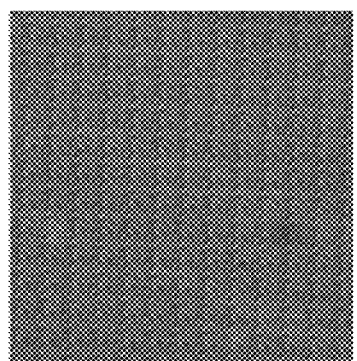

FIG. 2 is a diagram of a measurement image obtained when monochromatic lights with different wavelengths are incident on a micro spectral imaging sensor provided by the present application. As shown in FIG. 2, from left to right, there are the measurement images obtained when the monochromatic light with wavelengths of 500 nm, 530 nm and 560 nm are incident on the micro spectral imaging sensor. The measurement images of the monochromatic lights are three-dimensional image, one dimension of which includes spectral information. The data obtained from the three-dimensional image form a three-dimensional data set (X, Y, Z), which can be expressed as a data cube. The (X, Z) dimensions form the ground space covered by the image, and the third dimension (Y) is the spectral dimension, which is composed of several bands in the spectral space.

The spectral image of the imaging object obtained by reconstructing includes the spectral information of different position points of the imaging object, namely the image information when incident lights with different wavelengths incident on the imaging object.

It should be noted that only the spectral information of one position point of the imaging object can be obtained based on the traditional spectrometer, but the spectral information of different position points of the imaging object can be obtained according to the spectral image obtained by reconstructing in the present application.

In the embodiments of the present application, the measurement image of the imaging object is obtained by the micro spectral imaging sensor, and the spectral image of the imaging object is obtained by performing reconstruction according to the obtained measurement image and the pre-calibrated sensing matrix. This method provided by the present application overcomes the shortcomings of the spectral image reconstruction method in the related art, which is time-consuming and the obtained spectral image by which has a low resolution. By this method provided by the present application, the spectral image of the target imaging object can be obtained by reconstructing quickly and the obtained spectral image has high spatial resolution and no mosaic.

Based on the above embodiments, in an embodiment, the micro spectral imaging sensor includes an optical modulation layer, a microlens layer and an image sensor layer.

It should be noted, the measurement image of the imaging object is obtained based on the micro spectral imaging sensor and the micro spectral imaging sensor at least includes the optical modulation layer and the image sensor layer.

Figure 3:
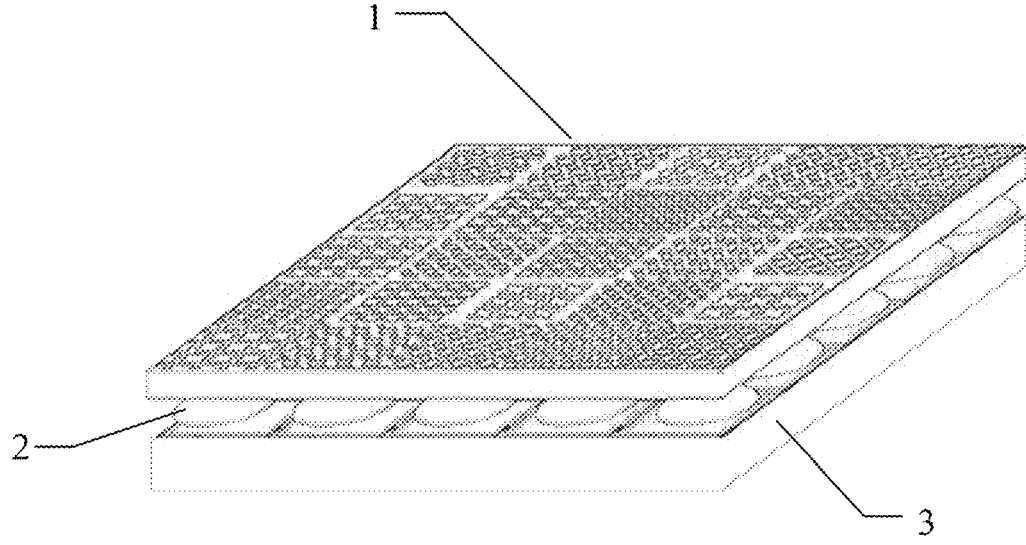
FIG. 3 is a structure diagram of a micro spectral imaging sensor provided by the present application.

In an embodiment, FIG. 3 is a structure diagram of a micro spectral imaging sensor provided by the present application. As shown in FIG. 3, the micro spectral imaging sensor includes an optical modulation layer 1 and an image sensor layer 3, and may further include a microlens layer 2. It should be noted that the micro spectral imaging sensor may also not include the microlens layer 2, but this embodiment takes the micro spectral imaging sensor including the microlens layer as an example.

The optical modulation layer 1 includes a plurality of units, each unit is composed of a plurality of sets of micro-nano structure arrays. The micro-nano structure array is a two-dimensional grating composed of random-shaped internal units and has different modulation effects on incident lights with different wavelengths, and different micro-nano structure arrays have different modulation effects on the same incident light. Each set of micro-nano structure arrays corresponds to one or more photosensitive pixels on the image sensor in a vertical direction.

After the incident light passes through the optical modulation layer 1, it is modulated by each set of micro-nano structure arrays in the unit. The image sensor layer 3 detects the intensity information of the modulated light signal and converts it into an electrical signal to obtain the corresponding measurement image.

Figure 4:
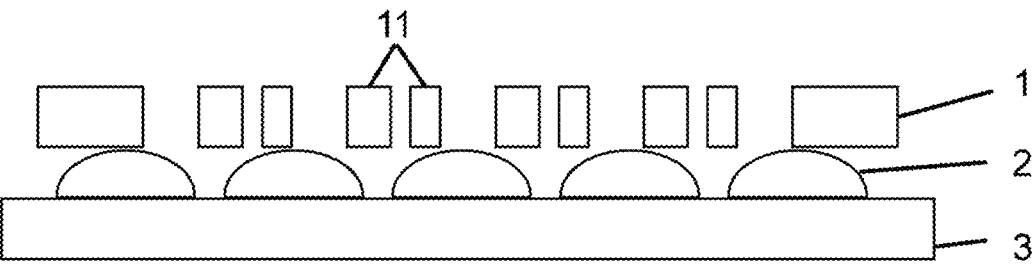
FIG. 4 is a longitudinal structure diagram of a micro spectral imaging sensor provided by the present application.

Further, FIG. 4 is a longitudinal structure diagram of a micro spectral imaging sensor provided by the present application.

As shown in FIG. 4, each micro-nano structure array in the optical modulation layer 1 is a two-dimensional grating based on the internal unit 11. For example, one or more layers of medium or metal material can be grown on other substrates, such as SOI substrate, monocrystalline silicon substrate, quartz substrate, etc., and after performing patterning and etching on it, it can be transferred on the microlens layer 2 and then be detected by the image sensor layer 3.

The micro-nano structure array has different modulation effects on the incident light of the target band by changing the transverse geometry and structural parameters of the internal unit 11.

In the embodiment, the micro spectral imaging sensor includes the optical modulation layer 1, the microlens layer 2 and the image sensor layer 3. The optical modulation layer 1 modulates the incident lights with different wavelengths by a two-dimensional grating composed of internal units with random shapes. The microlens layer 2 is used to aggregate the intensity of the modulated optical signal, and the image sensor layer 3 converts the aggregated intensity of the optical signal into an electrical signal and a corresponding measurement image is obtained. Compared with the traditional spectrometer, the micro spectral imaging sensor is smaller in size. Moreover, by the micro spectral imaging sensor, the incident light is modulated by using irregular random shape units, which is conducive to improving the spectral accuracy of spectral image reconstruction, that is, indirectly improving the spectral resolution of the reconstructed spectral image.

Based on the embodiments mentioned above, further, the spectral image of the imaging object is obtained by performing reconstruction according to the measurement image and the pre-calibrated sensing matrix includes: an initial spectral image of the imaging object is obtained by performing a linear transformation on the sensing matrix and the measurement image, and the spectral image is obtained by performing noise reduction on the initial spectral image using a convolutional neural network.

In an embodiment, the reconstruction method for spectral image provided by the embodiments of the present application includes K stages, where a value of K can be set according to the actual situation. In an embodiment, a value range of K can be 2-200. In other embodiments, the value of K can be set as other values, which is not limited here.

In an embodiment, each stage of the reconstruction method includes at least two steps which include performing the linear transformation on the sensing matrix and the measurement image and performing noise reduction using the convolutional neural network.

Figures 5, 6:
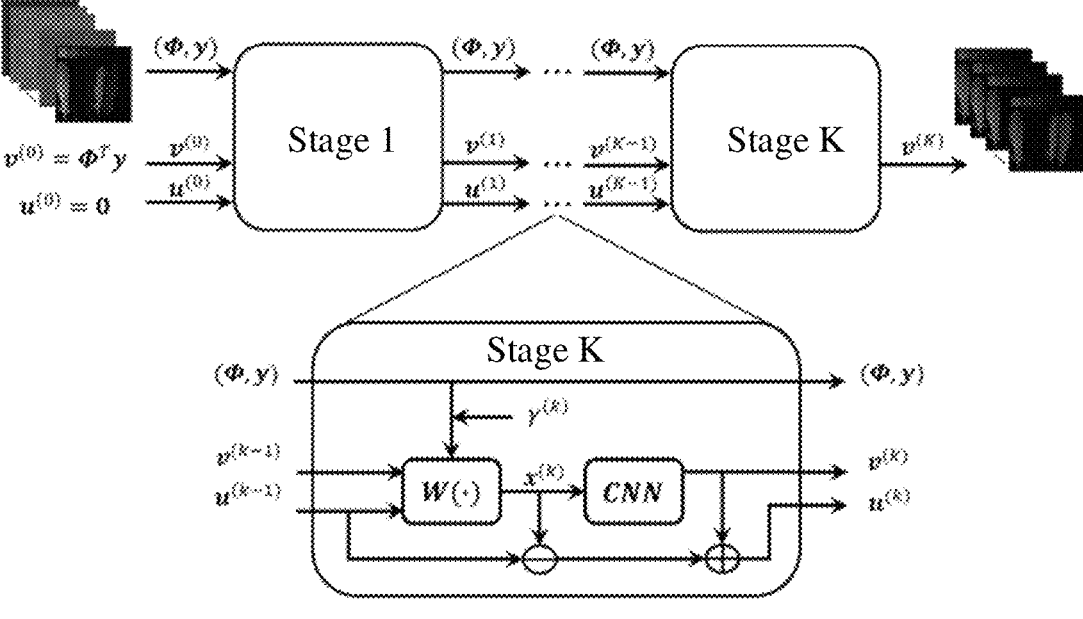
FIG. 5 is a first reconstruction diagram of a reconstruction method for spectral image provided by the present application.
FIG. 6 is a second reconstruction diagram of the reconstruction method for spectral image provided by the present application.

FIG. 5 is a first reconstruction diagram of a reconstruction method for spectral image provided by the present application. As shown in FIG. 5, in an embodiment, the linear transformation $W(\cdot)$ on the sensing matrix and the measurement image includes: performing a linear transformation $W(\cdot)$ on the sensing matrix $\Phi$ and the measurement image y through a first preset formula, and the first preset formula is:

$$x^{(k)}=[\Phi^T\Phi+\gamma^{(k)}I]^{-1}[\Phi^Ty+(v^{(k-1)}+u^{(k-1)}];$$

where, $x^{(k)}$ is an initial spectral image of $k^{th}$ stage, k is a label of a stage of the reconstruction method, $\Phi$ is the sensing matrix, $\gamma^{(k)}$ is a network trainable parameter of the $k^{th}$ stage, I is a unit matrix, y is the measurement image, $v^{(k-1)}$ is a spectral image of $(k-1)^{th}$ stage, and $u^{(k-1)}$ is an auxiliary variable of the $(k-1)^{th}$ stage.

In an embodiment, an initial value of the variable v is $v^{(0)}=\Phi^Ty$, and an initial value of the variable u is $u^{(0)}=0$.

In an embodiment, performing noise reduction on the initial spectral image using the convolutional neural network (CNN) includes: performing noise reduction on the initial spectral image using the convolutional neural network through a second preset formula. The second preset formula is as follows:

$$v^{(k)}=D_k(x^{(k)}-u^{(k-1)});$$

where $v^{(k)}$ is a spectral image of $k^{th}$ stage, k is a label of a stage of the reconstruction method, $D_k$ is a noise reduction network of the $k^{th}$ stage, $x^{(k)}$ is an initial spectral image of the $k^{th}$ stage, and $u^{(k-1)}$ is an auxiliary variable of $(k-1)^{th}$ stage.

According to the first preset formula and the second preset formula, it can be seen that the reconstruction method introduces two auxiliary variables x and u. In order to solve the spectral image of the $k^{th}$ stage, it is also needed to perform arithmetic conversion on the introduced auxiliary variables and the spectral image of the $k^{th}$ stage, for example, the conversion formula is as follows:

$$u^{(k)}=u^{(k-1)}-(x^{(k)}-v^{(k)}).$$

According to the above, the output result (namely the spectral image) can be obtained by performing the linear transformation in K stages on the measurement image and the sensing matrix and performing noise reduction using the convolutional neural network. Similarly, in general, the total number K of stages included in the reconstruction method is more than one, and the preset number of stages can be set according to the actual needs. The reconstructed spectral image can be obtained after the measurement image and the sensing matrix are processed by the preset number of stages.

In an embodiment, the more the total number K of stages included in the reconstruction method is, the better the performance of reconstructing spectral image is, and eventually tends to convergence.

It should be noted that the reconstruction method for spectral image provided in the embodiments of the present application can be realized by a neural network. Before performing inference prediction by using the whole neural network, the neural network can be trained through a large number of simulated or measured spectral image data sets until convergence, to realize a fast prediction from the sensing matrix and the measurement image to the spectral image, that is, a fast reconstruction of the spectral image.

In an embodiment, when the reconstruction method for spectral image is realized by neural network, the neural network can adopt a U-net network structure, auto-encoder structure or residual neural network structure, which is not limited here.

In an embodiment, FIG. 6 is a second reconstruction diagram of the reconstruction method for spectral image provided by the present application. As shown in FIG. 6, the convolutional neural network noise reduction module in each stage of the reconstruction method is pre-trained, that is, a large number of spectral image data sets with noise are used in advance to train the convolutional neural network noise reduction module to convergence. In this way, when training the whole neural network used in the reconstruction method, the network weight coefficient of the convolutional neural network noise reduction module in each stage is fixed, only the parameter $\gamma^{(k)}$ in each stage is a trainable parameter, and then the training time of the whole neural network will be greatly shortened.

In another embodiment, the reconstruction method for spectral image includes 12 stages, each stage includes a linear transformation module and a convolutional neural network noise reduction module. The linear transformation module corresponds to the first preset formula, and the convolutional neural network noise reduction module adopts the U-net network structure. The size of the input sensing matrix is 256×256×26, where 256×256 corresponds to the length and width of the spatial size, and 26 is the number of wavelength channels for different monochromatic lights, the size of the input measurement image is 256×256, and the size of the output spectral image is 256×256×26, which is a three-dimensional image information.

It should be noted that the number of wavelength channels included in the reconstructed spectral image can be flexibly selected according to the actual needs. The fewer the number of wavelength channels, the smaller the amount of data required for training the network and the shorter the training time.

In this embodiment, the reconstructed spectral image is obtained by performing a linear transformation on the sensing matrix and the measurement image and performing noise reduction using the convolutional neural network. This method provided by the present application overcomes the shortcomings of the spectral image reconstruction method in the related art which is time-consuming and the obtained spectral image by which has a low resolution. By this method provided by the present application, the spectral image of the target imaging object can be obtained by reconstructing quickly and the obtained spectral image has high spatial resolution and no mosaic.

On the basis of the above embodiments, further, the performing noise reduction on the initial spectral image using the convolutional neural network includes performing noise reduction on the initial spectral image using the convolutional neural network through one or more of the U-net network structure, the auto-encoder structure, and the residual neural network structure. In an embodiment, the noise reduction can be performed by using other network structures, which are not limited here.

Figure 7:
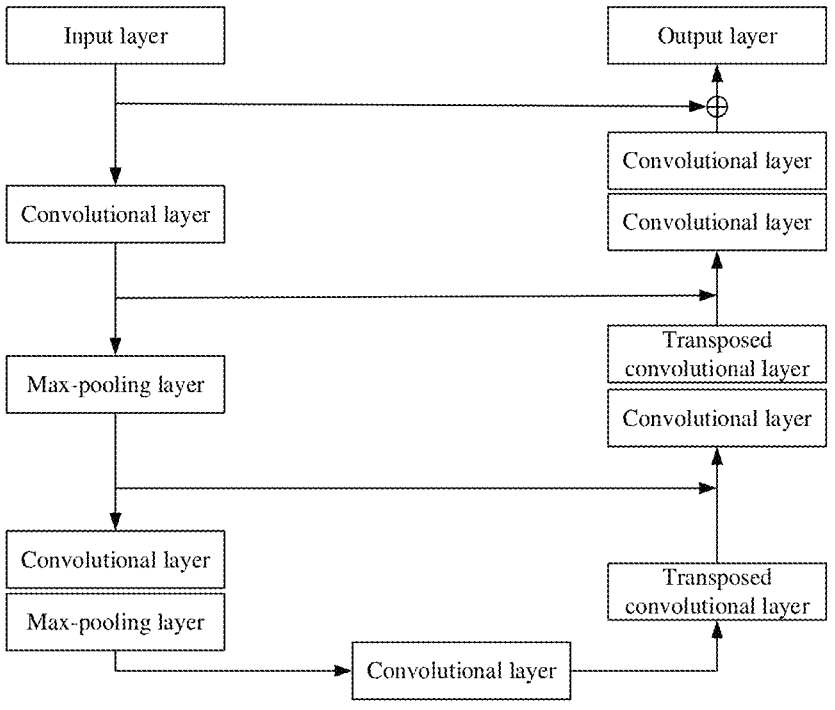
FIG. 7 is a first network structure diagram of a convolutional neural network noise reduction module provided by the present application.

In an embodiment, the convolutional neural network noise reduction module is the U-net network structure. FIG. 7 is a first network structure diagram of a convolutional neural network noise reduction module provided by the present application. As shown in FIG. 7, the convolutional neural network noise reduction module includes an input layer, a convolution layer, a max-pooling layer, a transposed convolution layer and an output layer.

Figure 8:
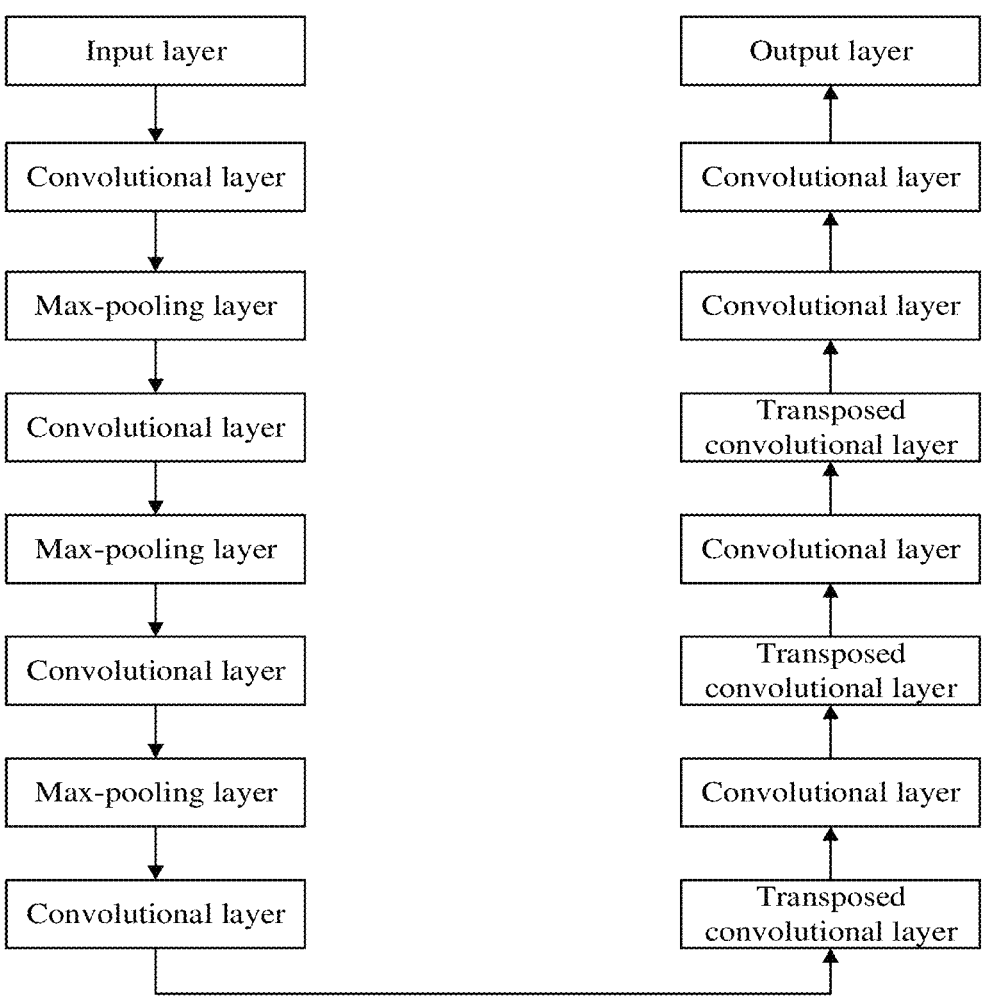
FIG. 8 is a second network structure diagram of the convolutional neural network noise reduction module provided by the present application.

In an embodiment, the convolutional neural network noise reduction module is the auto-encoder structure. FIG. 8 is a second network structure diagram of the convolutional neural network noise reduction module provided by the present application. As shown in FIG. 8, the convolutional neural network noise reduction module includes an input layer, a convolution layer, a max-pooling layer, a transposed convolution layer and an output layer.

Figure 9:
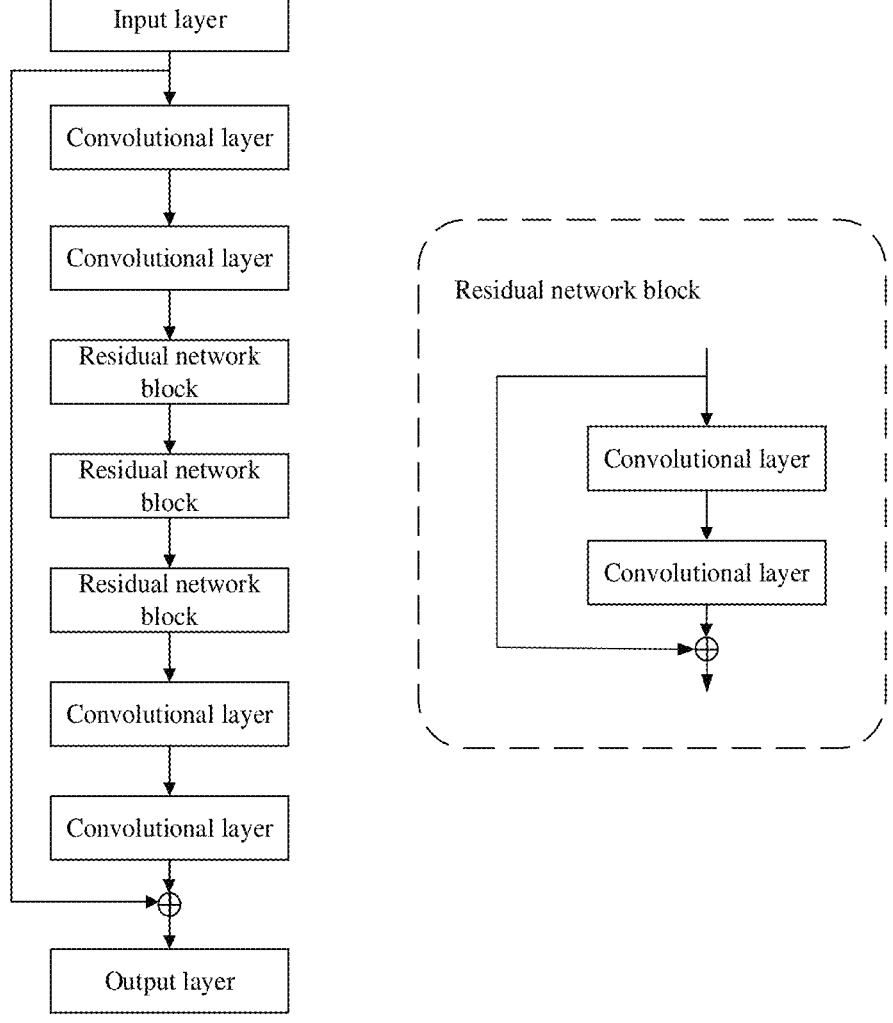
FIG. 9 is a third network structure diagram of the convolutional neural network noise reduction module provided by the present application.

In an embodiment, the convolutional neural network noise reduction module is the residual neural network structure. FIG. 9 is a third network structure diagram of the convolutional neural network noise reduction module provided by the present application. As shown in FIG. 9, the convolutional neural network noise reduction module includes an input layer, a convolution layer, a residual network block, and an output layer. The residual network block is composed of two convolution layers.

Figure 10:
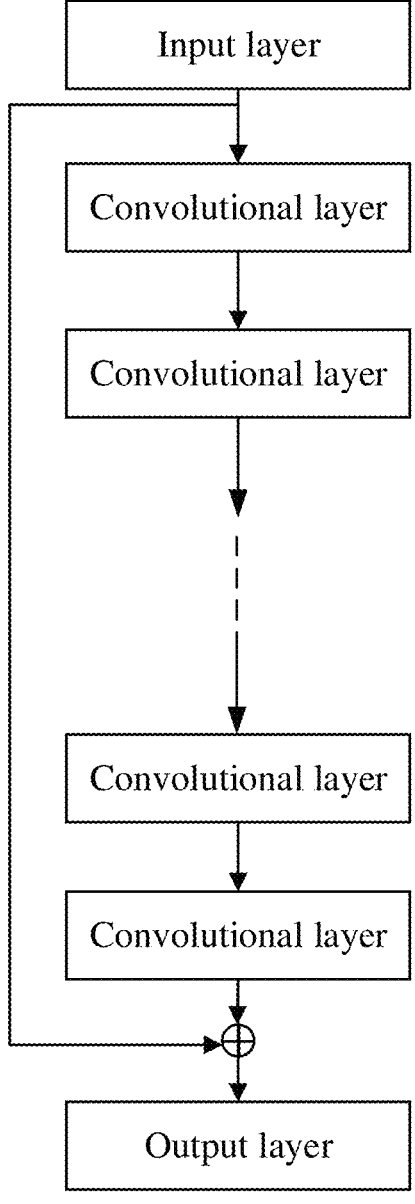
FIG. 10 is a fourth network structure diagram of the convolutional neural network noise reduction module provided by the present application.

In an embodiment, the convolutional neural network noise reduction module is a deep convolutional neural network. FIG. 10 is a fourth network structure diagram of the convolutional neural network noise reduction module provided by the present application. As shown in FIG. 10, the convolutional neural network noise reduction module includes an input layer, a convolution layer, and an output layer.

In the embodiments of the present application, the convolutional neural network noise reduction module is the U-net network structure, the auto-encoder structure or the residual neural network structure. Different convolutional neural network structures can be used for different scenarios to better process the sensing matrix and the measurement image, to achieve better reconstruction effect of spectral image.

In addition, it should be noted that, based on the principle of spectral reconstruction described above, it can be learned that the traditional point-by-point method for spectral reconstruction requires to perform spectral reconstruction for each point in the space. For example, for a spectral image containing 256×256 points, it is needed to preform 256×256 spectral reconstructions in the traditional method, and the spectral reconstruction of each point requires to solve the following linear formula with an iterative optimization algorithm:

$$\tilde{y} = M\tilde{x};$$

where, $\tilde{y}$ represents a measurement vector composed of N measurement values near the point, $\tilde{x}$ represents an incident light spectra of the point, and M represents a transmission spectra matrix of N light filter structure units near the point.

In addition to the time-consuming reconstruction of the spectral image by the traditional method, since the incident light spectra of N points near the point are approximately considered to be the same when performing spectral reconstruction for each point, the reconstructed spectral image may exhibit mosaic characteristics.

Figure 11:
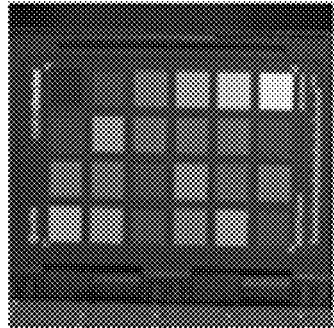
FIG. 11 is a reconstruction effect comparison diagram of a reconstruction method for spectral image provided by the present application and a traditional point-by-point method for spectral reconstruction.
Figure 11:
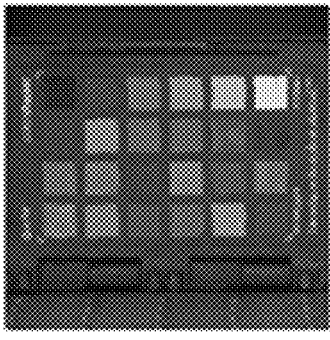
Figure 11:
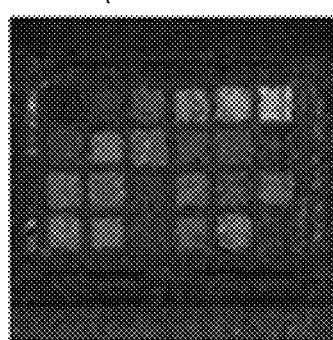

FIG. 11 is a reconstruction effect comparison diagram of a reconstruction method for spectral image provided by the present application and a traditional point-by-point method for spectral reconstruction. The reference image in the FIG. 11 is the original image. According to FIG. 11, it can be seen that compared with the traditional point-by-point method for spectral reconstruction, the spectral image obtained by the reconstruction method for spectral image provided by the present application has higher spatial resolution and no mosaic.

That is, the spectral image obtained by the reconstruction method for spectral image provided in the present application has higher clarity, while the spectral image obtained by the traditional point-by-point method for spectral reconstruction has lower clarity and is full of mosaic.

Moreover, compared with the traditional point-by-point method for spectral reconstruction, the reconstruction method for spectral image provided in the present application takes much less time. For example, the following table shows the required time for reconstructing spectral images with the same size of 256×256×26 by the two methods.

| | Reconstruction method for spectral image of the present application | Traditional point-by-point method for spectral reconstruction |
| --- | --- | --- |
| Time (second) (CPU) | 1.72 | 4854 |
| Time (second) (GPU) | 0.018 | not applicable |

According to this table, it can be seen that whether in CPU (Intel Xeon Gold 6226R) or GPU (NVIDIA GeForce RTX 3080) environment, the required time of the reconstruction method provided by the present application is far less than that of the traditional spectral reconstruction method, which can realize a rapid reconstruction of spectral image.

According to the above, by the reconstruction method for spectral image provided by the present application, the rapid reconstruction of the spectral image with high spatial resolution of the target imaging object can be realized. In the method provided by the present application, the consumed time of reconstructing a single spectral image is generally in the level of milliseconds to seconds, the speed of reconstructing the single spectral image is improved by four to five levels compared with the traditional point-by-point method for spectral reconstruction, and the reconstructed spectral image has no mosaic.

It should be noted that the reconstruction method for spectral image provided in the present application can realize a continuous spectral image reconstruction for dynamic targets and moving scenes, that is, video-level spectral image reconstruction.

Figure 12:
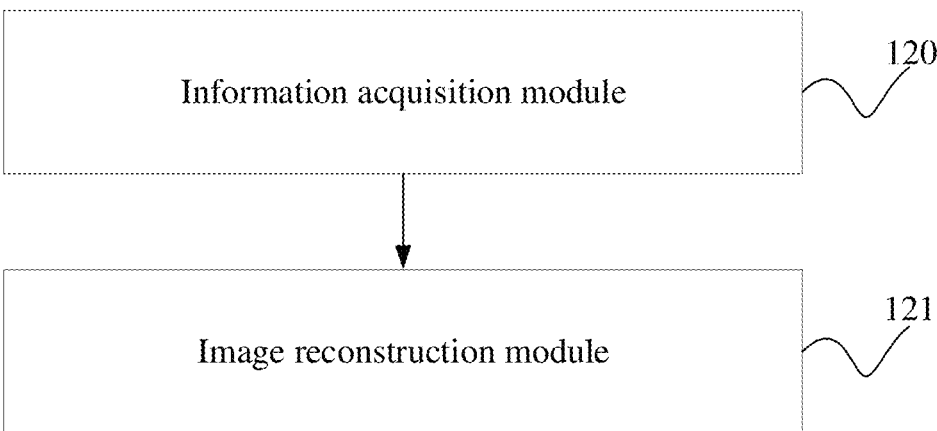
FIG. 12 is a structure diagram of a reconstruction device for spectral image provided by the present application.

FIG. 12 is a structure diagram of a reconstruction device for spectral image provided by the present application. The reconstruction device includes: an information acquisition module 120, used to obtain a measurement image of an imaging object; and an image reconstruction module 121, used to perform reconstruction to obtain a spectral image of the imaging object according to the measurement image and a pre-calibrated sensing matrix; where the sensing matrix is determined by images corresponding to monochromatic lights of different wavelength bands and light intensities of corresponding monochromatic lights; and the spectral image includes spectral information at different position points of the imaging object.

In the embodiment, the measurement image of the imaging object is obtained by the information acquisition module 120, and the spectral image of the imaging object is obtained by reconstructing according to the obtained measurement image and the pre-calibrated sensing matrix by the image reconstruction module 121. The reconstruction device for spectral image provided by the present application overcomes the shortcomings of the spectral image reconstruction method in the related art, which is time-consuming and the obtained spectral image by which has a low resolution. By this method provided by the present application, the spectral image of the target imaging object can be obtained by reconstructing quickly and the obtained spectral image has high spatial resolution and no mosaic.

The description of the reconstruction device for spectral image provided in the present application and the above description of the reconstruction method for spectral image can be referred to each other, which is not repeated here.

Figure 13:
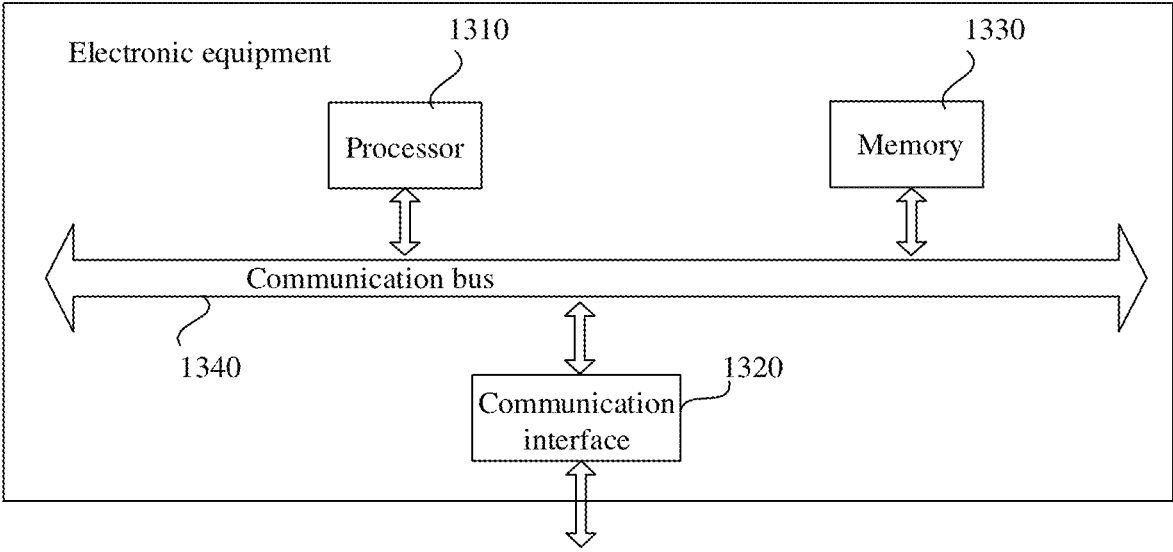
FIG. 13 is a structure diagram of an electronic equipment provided by the present application.

FIG. 13 is a structure diagram of an electronic equipment provided by the present application. As shown in FIG. 13, the electronic equipment can include: a processor 1310, a communication interface 1320, a memory 1330 and a communication bus 1340. The processor 1310, the communication interface 1320 and the memory 1330 can communicate with each other through the communication bus 1340. The processor 1310 could call logic instructions stored on the memory 1330 to perform the reconstruction method for spectral image, where the reconstruction method includes: obtaining a measurement image of an imaging object, and performing reconstruction to obtain a spectral image of the imaging object according to the measurement image and a pre-calibrated sensing matrix; where the sensing matrix is determined by images corresponding to monochromatic lights of different wavelength bands and light intensities of corresponding monochromatic lights; and the spectral image includes spectral information at different position points of the imaging object.

In addition, the logic instructions in the memory 1330 may be implemented in the form of software functional units and sold or used as independent products, it may be stored in a computer readable storage medium. Based on such understandings, the solutions of the present application or the part that contributes to the related art or the part of the solutions can be embodied in the form of a software product in essence. The computer software product is stored in a storage medium, including a number of instructions to enable a computer device (such as personal computers, servers, or network equipment, etc.) to perform all or a part of the steps of the methods described in each embodiment of the present application. The foregoing storage medium includes USB flash memory, mobile hard disk, read-only memory (ROM), random access memory (RAM), magnetic disk or optical disk and other mediums that may store program code.

In addition, the present application further provides a computer program product, including a computer program. The computer program can be stored on non-transient computer readable storage medium. The computer program, when executed by a processor, causes the processor to perform steps of any one of the above-mentioned reconstruction method for spectral image. The reconstruction method includes: obtaining a measurement image of an imaging object, and performing reconstruction to obtain a spectral image of the imaging object according to the measurement image and a pre-calibrated sensing matrix; where the sensing matrix is determined by images corresponding to monochromatic lights of different wavelength bands and light intensities of corresponding monochromatic lights; and the spectral image includes spectral information at different position points of the imaging object.

In addition, the present application further provides a non-transitory computer readable storage medium having a computer program stored thereon, and when the computer program is executed by the processor, the processor performs the steps of any one of the above-mentioned reconstruction method for spectral image. The reconstruction method includes: obtaining a measurement image of an imaging object, and performing reconstruction to obtain a spectral image of the imaging object according to the measurement image and a pre-calibrated sensing matrix; where the sensing matrix is determined by images corresponding to monochromatic lights of different wavelength bands and light intensities of corresponding monochromatic lights; and the spectral image includes spectral information at different position points of the imaging object.

The device embodiments described above is only illustrative, in which the unit described as a separate component may be or may not be physically separated, and the component displayed as a unit may be or may not be a physical unit. That is, it may be located in one position or may be distributed to multiple network units. Some or all of the modules may be selected according to the actual needs to achieve the purpose of the solutions in these embodiments. Those of ordinary skill in the art may understand and implement these embodiments without creative effort.

From the description of the above embodiments, those skilled in the art can clearly understand that each embodiment can be implemented by means of software plus a necessary general hardware platform, and certainly can also be implemented by hardware. Based on this understanding, the above solutions or the part of the solutions that contributes to the related art can be embodied in the form of a software product, and the computer software products can be stored in computer-readable storage media, such as ROM/RAM, magnetic disk, optical disk or the like, including several instructions for causing a computer device (which can be a personal computer, a server, or a network equipment or the like) to perform the methods described in various embodiments or some parts of the embodiments.

Finally, it should be noted that the above embodiments are only used to illustrate the solutions of the present application, but not to limit them; although the present application has been described in detail with reference to the foregoing embodiments, those of ordinary skill in the art should understand that: they can still modify the solutions described in the foregoing embodiments, or equivalently replace some features thereof; while these modifications or replacements do not make the essence of the corresponding solutions deviate from the scope of the solutions in the embodiments of the present application.

What is claimed is:

1. A reconstruction method for spectral image, comprising:

obtaining a measurement image of an imaging object; and performing reconstruction to obtain a spectral image of the imaging object according to the measurement image and a pre-calibrated sensing matrix, wherein the sensing matrix is determined by images corresponding to monochromatic lights of different wavelength bands and light intensities of corresponding monochromatic lights, and the spectral image comprises spectral information at different position points of the imaging object;

the measurement image is obtained by a micro spectral imaging sensor, wherein the micro spectral imaging sensor at least comprises an optical modulation layer and an image sensor layer under the optical modulation layer;

wherein the reconstruction method further comprises:

storing the pre-calibrated sensing matrix corresponding to the micro spectral imaging sensor, wherein different pre-calibrated sensing matrixes correspond to different types of spectral imaging sensors; and establishing a corresponding relationship between the sensing matrix and the micro spectral imaging sensor.

2. The reconstruction method for spectral image according to claim 1, wherein, the performing reconstruction to obtain the spectral image of the imaging object according to the measurement image and the pre-calibrated sensing matrix comprises:

performing a linear transformation on the sensing matrix and the measurement image to obtain an initial spectral image of the imaging object; and performing noise reduction on the initial spectral image to obtain the spectral image.

3. The reconstruction method for spectral image according to claim 2, wherein, performing the linear transformation on the sensing matrix and the measurement image through a first preset formula, and the first preset formula is:

$$x^{(k)}=[\Phi^T\Phi+\gamma^{(k)}I]^{-1}[\Phi^Ty+(v^{(k-1)}+u^{(k-1)}];$$

wherein, $x^{(k)}$ is an initial spectral image of $k^{th}$ stage, k is a label of a stage of the reconstruction method, $\Phi$ is the sensing matrix, $\gamma^{(k)}$ is a network trainable parameter of the $k^{th}$ stage, I is a unit matrix, y is the measurement image, $v^{(k-1)}$ is a spectral image of $(k-1)^{th}$ stage, an initial value of $v^{(k-1)}$ is $v^{(0)}=\Phi^Ty$, $u^{(k-1)}$ is an auxiliary variable of the $(k-1)^{th}$ stage, and an initial value of the variable $u^{(k-1)}$ is $u^{(0)}=0$.

4. The reconstruction method for spectral image according to claim 2, wherein performing noise reduction on the initial spectral image through a second preset formula, and the second preset formula is:

$$v^{(k)}=D_k(x^{(k)}-u^{(k-1)});$$

wherein, $v^{(k)}$ is a spectral image of $k^{th}$ stage, k is a label of a stage of the reconstruction method, $D_k$ is a noise reduction network of the $k^{th}$ stage, and $x^{(k)}$ is an initial spectral image of the $k^{th}$ stage, and $u^{(k-1)}$ is an auxiliary variable of $(k-1)^{th}$ stage.

5. The reconstruction method for spectral image according to claim 3, wherein the auxiliary variables x and u and the spectral image $v^{(k)}$ of the $k^{th}$ stage are converted through a conversion formula as follows:

$$u^{(k)}=u^{(k-1)}-(x^{(k)}-v^{(k)}).$$

6. The reconstruction method for spectral image according to claim 1, wherein the pre-calibrated sensing matrix is obtained by:

obtaining three-dimensional images obtained when monochromatic lights with different wavelengths are incident on the micro spectral imaging sensor, wherein the three-dimensional images at least comprise spectral information; and performing calculation to generate the pre-calibrated sensing matrix according to the obtained three-dimensional images and intensities of the monochromatic lights with different wavelengths.

7. The reconstruction method for spectral image according to claim 2, wherein the performing noise reduction on the initial spectral image to obtain the spectral image comprises:

performing noise reduction based on a convolutional neural network on the initial spectral image through one or more of U-net network structure, auto-encoder structure, deep convolutional neural network and residual neural network structure.

8. An electronic equipment, comprising a processor and a memory storing a computer program that is executable on the processor, wherein the computer program, when executed by the processor, causes the processor to perform steps of the reconstruction method for spectral image according to claim 1.

9. A non-transitory computer readable storage medium having a computer program stored thereon, wherein the computer program, when executed by a processor, causes the processor to perform steps of the reconstruction method for spectral image according to claim 1.

10. The reconstruction method for spectral image according to claim 4, wherein the auxiliary variables x and u and the spectral image $v^{(k)}$ of the $k^{th}$ stage are converted through a conversion formula as follows:

$$u^{(k)}=u^{(k-1)}-(x^{(k)}-v^{(k)}).$$

11. The reconstruction method for spectral image according to claim 7, wherein, when performing noise reduction based on the convolutional neural network on the initial spectral image through the U-net network structure, the noise reduction based on the convolutional neural network comprises processes of an input layer, a convolutional layer, a max-pooling layer, a transposed convolutional layer, and an output layer;

when performing noise reduction based on the convolutional neural network on the initial spectral image through the self-encoder structure, the noise reduction based on the convolutional neural network comprises processes of an input layer, a convolutional layer, a max-pooling layer, a transposed convolutional layer and an output layer;

when performing noise reduction based on the convolutional neural network on the initial spectral image through the residual neural network structure, the noise reduction based on the convolutional neural network comprises processes of an input layer, a convolutional layer, a residual network block, and an output layer, wherein the residual network block consists of two convolutional layers; and when performing noise reduction based on the convolutional neural network on the initial spectral image through the deep convolutional neural network, the noise reduction based on the convolutional neural network comprises processes of an input layer, a convolution layer and an output layer.

12. A reconstruction system for spectral image, comprising: a spectral imaging sensor and a reconstruction device for spectral image, wherein, the spectral imaging sensor is configured to obtain a measurement image of an imaging object; and the reconstruction device for spectral image is configured to perform reconstruction to obtain a spectral image of the imaging object according to the measurement image and a pre-calibrated sensing matrix;

wherein the sensing matrix is determined by images corresponding to monochromatic lights of different wavelength bands and light intensities of corresponding monochromatic lights, and the spectral image comprises spectral information at different position points of the imaging object;

the measurement image is obtained by the spectral imaging sensor, wherein the spectral imaging sensor at least comprises an optical modulation layer and an image sensor layer under the optical modulation layer;

wherein the reconstruction device for spectral image is further configured to:

store the pre-calibrated sensing matrix corresponding to the micro spectral imaging sensor, wherein different pre-calibrated sensing matrixes correspond to different types of spectral imaging sensors; and establish a corresponding relationship between the sensing matrix and the spectral imaging sensor.

13. A reconstruction device for spectral image, comprising a processor and a memory storing computer program that is executable on the processor, wherein the computer program, when executed by the processor, causes the processor to:

obtain a measurement image of an imaging object; and perform reconstruction to obtain a spectral image of the imaging object according to the measurement image and a pre-calibrated sensing matrix;

wherein the sensing matrix is determined by images corresponding to monochromatic lights of different wavelength bands and light intensities of corresponding monochromatic lights, and the spectral image comprises spectral information at different position points of the imaging object;

wherein the measurement image is obtained by a micro spectral imaging sensor, the micro spectral imaging sensor at least comprises an optical modulation layer and an image sensor layer under the optical modulation layer;

wherein the computer program, when executed by the processor, causes the processor to:

store the pre-calibrated sensing matrix corresponding to the micro spectral imaging sensor, wherein different pre-calibrated sensing matrixes correspond to different types of spectral imaging sensors; and establish a corresponding relationship between the sensing matrix and the micro spectral imaging sensor.

* * * * *